United States Patent
Esbensen

(10) Patent No.: US 11,378,057 B2
(45) Date of Patent: Jul. 5, 2022

(54) METHOD FOR CONTROLLING YAWING OF A WIND TURBINE

(71) Applicant: Siemens Gamesa Renewable Energy A/S, Brande (DK)

(72) Inventor: Thomas Esbensen, Herning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 26 days.

(21) Appl. No.: 16/970,127

(22) PCT Filed: Dec. 14, 2018

(86) PCT No.: PCT/EP2018/084986
§ 371 (c)(1),
(2) Date: Aug. 14, 2020

(87) PCT Pub. No.: WO2019/161960
PCT Pub. Date: Aug. 29, 2019

(65) Prior Publication Data
US 2020/0400119 A1  Dec. 24, 2020

(30) Foreign Application Priority Data
Feb. 22, 2018 (EP) .................................. 18158067

(51) Int. Cl.
*F03D 7/02* (2006.01)
*F03D 7/04* (2006.01)

(52) U.S. Cl.
CPC .......... *F03D 7/0204* (2013.01); *F03D 7/042* (2013.01); *F05B 2270/329* (2013.01)

(58) Field of Classification Search
CPC .................... F03D 7/0204; F05B 2270/329
See application file for complete search history.

(56) References Cited

U.S. PATENT DOCUMENTS

| 7,952,215 B2* | 5/2011 | Hayashi | H02P 9/00 290/44 |
| 8,043,055 B2* | 10/2011 | Matsuo | F03D 7/0204 416/9 |

(Continued)

FOREIGN PATENT DOCUMENTS

| EP | 2143939 A1 | 1/2010 |
| WO | 2017194067 A1 | 11/2017 |
| WO | 2018001433 A1 | 1/2018 |

OTHER PUBLICATIONS

International Search Report and Written Opinion of the International Searching Authority in corresponding PCT Patent Application No. PCT/EP2018/084986, dated May 20, 2019. 12 pages.

(Continued)

*Primary Examiner* — Justin D Seabe
(74) *Attorney, Agent, or Firm* — Schmeiser, Olsen & Watts LLP

(57) ABSTRACT

A method for controlling yawing of a wind turbine,
wherein an efficiency information is determined based on previous yaw activities,
wherein the efficiency information reflects a relationship between
an effective angular change between at least two yaw positions of the previous yaw activities, and
a corresponding accumulated angular movement between the at least two yaw positions,
wherein the yawing is controlled based on the determined efficiency information is provided.
Further, a wind turbine and a device as well as a computer program product and a computer readable medium are suggested for performing the method is also provided.

14 Claims, 1 Drawing Sheet

(56) References Cited

U.S. PATENT DOCUMENTS

| | | | | |
|---|---|---|---|---|
| 8,450,867 B2* | 5/2013 | Fukami | ................... | F03D 7/042 |
| | | | | 290/44 |
| 9,841,004 B2* | 12/2017 | Kii | ........................ | F03D 7/0204 |
| 11,078,884 B2* | 8/2021 | Nielsen | ................... | F03D 17/00 |
| 2020/0102932 A1* | 4/2020 | Hovgaard | ............... | F03D 7/042 |

OTHER PUBLICATIONS

Extended European Search Report in corresponding European Patent Application No. 18158067.1 dated Aug. 29, 2018. 5 pages.

\* cited by examiner

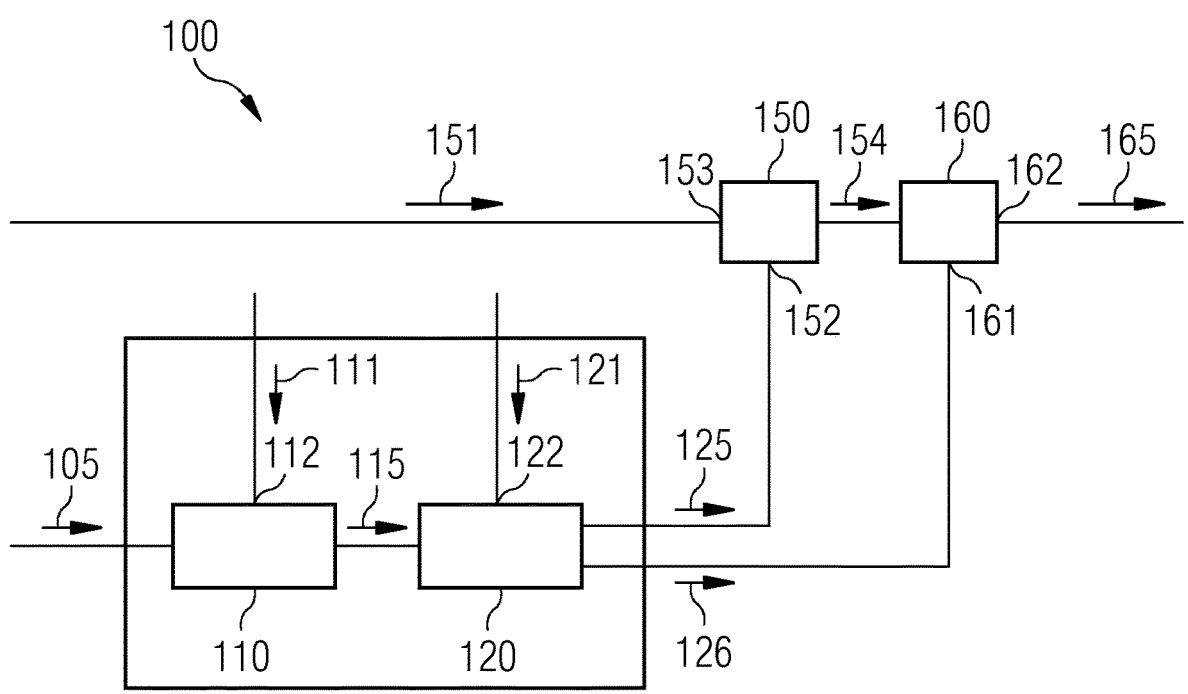

METHOD FOR CONTROLLING YAWING OF A WIND TURBINE

CROSS-REFERENCE TO RELATED APPLICATIONS

This application claims priority to PCT Application No. PCT/EP2018/084986, having a filing date of Dec. 14, 2018, which is based off of European Patent Application No. 18158067.1, having a filing date of Feb. 22, 2018, the entire contents both of which are hereby incorporated by reference.

FIELD OF TECHNOLOGY

The following relates to a method, a wind turbine and to a device for controlling yawing of a wind turbine. In addition, an according computer program product and a computer readable medium are suggested.

BACKGROUND

A wind turbine in operation will not always experience wind perpendicular to a rotor plane. When the rotor plane (which is also referred to as "heading") of a wind turbine is not perpendicular to the wind, the efficiency will decrease. Therefore, actual wind turbines comprise a yaw system designed to automatically adjust their heading, like, e.g., rotating the rotor plane perpendicular to the incoming wind ("wind direction") or to maintain a specific angle relative to the wind to maximize the surface area of the turbine rotor. That kind of rotation around a vertical axis is also referred to as "yawing" or "yaw activity".

Usually, the yaw system is part of a nacelle, which may be involved in a yaw activity or yawing movement, i.e. being rotatable mounted on top of a tower via at least one yaw bearing. A rotor is attached to an upwind side of the nacelle. The rotor is coupled via a drive train to a generator housed inside the nacelle. The rotor includes a central rotor hub and a plurality of blades mounted to and extending radially from the rotor hub defining the rotor plane.

The direction of incoming wind may be determined by a weather station being part of the wind turbine comprising, e.g. at least one a wind vane and/or a sonic wind instrument.

An actual direction of the nacelle is also referred to as a yaw direction of a yaw position or, in relation to a predefined direction (e.g. cardinal direction), as a yaw angle ("absolute yaw angle").

Alternatively the yaw angle may be defined as the direction of the nacelle in relation to the direction of incoming wind (also referred to as "yaw angle error") representing the angle out of incoming wind.

Aligning the nacelle into the wind causes stress to the yaw system and consumes energy. Aiming for a defined lifetime of the yaw system in combination with reduced energy consumption the yaw system may be actuated only in case of a yaw angle error exceeding a defined threshold.

However, under conditions of turbulent wind like, e.g., wake, the yaw system may be repeatedly activated without providing the expected benefit for that movement, i.e. the yaw system may be less effective by moving back and forth without a significant change of the yaw direction over time.

However, by generally reducing the activities of the yaw system (e.g. by a restrictive controller configuration), necessary yawing may be prevented or delayed in case of significant changes of the wind direction.

According to an exemplary default configuration, the yaw system may act discretely, i.e. not continuously, thereby adjusting the rotor plane towards the incoming wind in case the detected yaw angle error is exceeding a predefined threshold for a predefined time interval.

Correction of the yaw direction may be based on average misalignment information. As an example, such kind of misalignment information may be an average angular yaw angle error (calculated on the basis of filtered yaw angle errors in degrees) wherein the filtered/average yaw angle error has to exceed a defined threshold value (e.g., a value of 3 degree).

Usually the yaw system is a slowly acting system (typically moving 0.1 to 0.3 degree per second) which needs a long time period for a correct adjustment of the yaw direction in case of a large and fast change of direction of the wind.

Typically a yaw system is actuating 5% to 15% of the operating time. This performance may be usually achieved by adjusting a time constant of a filter unit processing measured wind direction values and by adjusting an angular threshold value which has to be exceeded by the determined yaw angle error before the yaw system is actuated.

However, such adjustment of the yaw system assumes a certain dynamic of the wind wherein in case of a higher turbulence, e.g. caused by wake of a wind turbine, there may be too much yaw actuation causing too much loads on the yaw system without an effective reduction of the yaw angle error in respect of a long time scale.

SUMMARY

An aspect relates to an improved approach for optimizing the yaw activities of a wind turbine.

An aspect relates to a method is provided for controlling yawing of a wind turbine,
  wherein an efficiency information is determined based on previous yaw activities,
  wherein the efficiency information reflects a relationship between
    an effective angular change between at least two yaw positions of the previous yaw activities, and
    a corresponding accumulated angular movement between the at least two yaw positions, wherein the yawing is controlled based on the efficiency information.

Previous yaw activities may be those yaw activities which already happened in the past, i.e. before an actual moment in time ("current time horizon").

Further, yaw activities according to the proposed solution may be those angular movements or angular traveling of the nacelle or rotor plane along a way between at least two yaw positions. As an example, yaw activities may comprise all angular changes of the nacelle starting from a first (initial) yaw position and ending at a second (final) yaw position.

According to one possible embodiment of the proposed solution, only those yaw positions may be considered being part of the angular movement during a given time interval in the past covering, e.g., 2 or 5 or 10 minutes.

Thereby, the time interval may be dynamic, i.e. a moving time interval. As an example those yaw activities may be considered which happened during the last 10 minutes before the current time horizon.

Efficiency information may be any kind of information indicating the efficiency of the angular movement. Thereby, angular movement may cover, e.g., the angular movement of the nacelle from a first angular yaw position (P1) at the beginning of the defined time interval (e.g. at a time T1) to a second angular yaw position (P2) at the end of the time interval (e.g. at a time T2, which might be the current moment in time).

In particular the efficiency information may reflect the relationship between an effective angular change representing a direct angular movement from the first angular yaw position to the second angular yaw position and the corresponding accumulated angular movement of the nacelle during its angular change or traveling from the first angular yaw position to the second angular yaw position.

In other words, the corresponding accumulated angular movement may cover also possible back and forth movement of the nacelle during its way/travel from the first angular yaw position to the second angular yaw position.

The determination of the efficiency information may be "time-based" like, e.g. measuring the duration of yawing (count time when turbine is yawing) for the angular movement of the nacelle during its angular change or traveling from the first angular yaw position to the second angular yaw position. Based on the measurement result, i.e. the measured time, the angular change or movement may be derived on basis of (e.g. by multiplying with) an "estimated or assumed yaw speed".

The determination of the efficiency information may be also based on a "distance" or "angle", like, e.g., a measurement of the "traveled" distance or angle of the accumulated angular movement of the nacelle during its angular change or traveling from the first angular yaw position to the second angular yaw position.

One main aspect of the proposed solution is the controlling of a wind turbine in such a way to reduce or avoid yaw activity in case of detected yaw actuation without a corresponding improvement of the wind turbine performance.

Wind turbine performance may be represented by the amount of energy produced by the wind turbine.

In an embodiment, the yawing is controlled on the basis of captured yaw angle error information wherein the captured yaw angle error information is processed on the basis of the determined efficiency information.

Yaw angle error information may represent a possible misalignment between a current direction of the nacelle and a current direction of incoming wind which might be also referred to as the "angle out of incoming wind".

In another embodiment,
the captured yaw angle error information is filtered on the basis of a filter time constant being derived on the basis of the determined efficiency information,
the yawing is controlled on the basis of the filtered yaw angle information.
Pursuant to another embodiment
the captured yaw angle error information is compared with a given threshold information,
the threshold information is derived on the basis of the determined efficiency information,
the yawing is controlled on the basis of the result of the comparison with the given threshold information.
In a further embodiment, the filtered yaw angle error information is processed on the basis of the determined efficiency information.
In a next embodiment,
the filtered yaw angle error information is compared with a given threshold information,
the threshold information is derived on the basis of the determined efficiency information,
the yawing is controlled on the basis of the result of the comparison with the given threshold information.

As an example, in case the filtered yaw error information exceeds an adjusted threshold value (i.e. being adjusted according to the proposed efficiency information) yawing or yaw activities of the wind turbine will be initiated. Otherwise, i.e. the filtered yaw error information is below the adjusted threshold value, any yaw activity is prevented, i.e. the current yaw direction of the nacelle is not changed.

It is also an embodiment that the efficiency information is determined according to the following rule:

$$YawProgression\ [\%] = \frac{YawMovement}{YawActuation} * 100\%$$

wherein
YawProgression is representing the efficiency information
YawMovement is representing the effective angular change
YawActuation is representing accumulated angular movement In other words, YawProgression may be the ratio of the final angular effective change of the considered yaw activities in relation to the total angular traveling/movement of the considered yaw activities.

Pursuant to another embodiment,
the effective angular change is determined according to the following rule:

$$YawMovement[deg]=abs(YawPosition(T1)-YawPosition(T2))$$

the corresponding accumulated angular movement is determined according to the following rule:

$$YawActuation\ [deg] = \sum_{k=TimeStart=T1}^{k=TimeStop=T2} abs(YawPosition(k) - YawPosiiton(k-1))$$

wherein
YawPosition(k=T1) is a first angular yaw position (P1) of the nacelle at a beginning (T1) of a defined time interval,
YawPosition(k=T2) is a second angular yaw position (P2) of the nacelle at an end (T2) of the defined time interval It should be noted that only those yaw positions being finally part of the angular movement are free to be assigned to the effective angular change, i.e. only those yaw positions being part of the angular traveling of the nacelle along its way from the first to the second yaw position shall be considered for determining the effective angular change.

As an example, the angular movement of the nacelle may exemplarily cover the following angular position sequence in [deg]: "358-359-0-1-2-3" which results in an angular change of 5 deg and not 355 deg. In other words, by moving from the first angular yaw position (=358 deg) to the second angular yaw position [=3 deg) via the "Zero" angular yaw position [=0 deg) only the angular yaw positions "358-359-0-1-2-3" are part of (i.e. are covered by) the angular traveling of the nacelle and thus are allowed to be assigned to the effective angular change. Consequently the remaining angular yaw positions "357-356-355- . . . -6-5-4" are not part of (i.e. are not covered by) the angular traveling of the nacelle and thus shall not be assigned to the effective angular change).

According to an exemplary embodiment only those yaw positions may be considered being part of the angular movement during a given time interval in the past covering, e.g., 2 or 5 or 10 minutes.

Thereby, the time interval may be dynamic, like, e.g. covering the last 10 minutes before the current time horizon.

According to an embodiment, the yawing is controlled in such a way that the efficiency information is reaching a target value.

As an example, the efficiency information may be varied on the basis of an optimization algorithm implementing, e.g. a cost function optimization.

According to another embodiment, the yawing is controlled on the basis of a PI-controller.

The problem stated above is also solved by a wind turbine comprising
a processing unit that is arranged for
determining an efficiency information based on previous yaw activities,
wherein the efficiency information reflects a relationship between
an effective angular change between at least two yaw positions of the previous yaw activities, and
a corresponding accumulated angular movement between the at least two yaw positions, controlling yawing of the wind turbine based on the efficiency information.

The problem stated above is also solved by a device comprising and/or being associated with a processing unit and/or hard-wired circuit and/or a logic device that is arranged such that the method as described herein is executable thereon.

The processing unit may comprise at least one of the following: a processor, a microcontroller, a hard-wired circuit, an ASIC, an FPGA, a logic device.

The solution provided herein further comprises a computer program product (non-transitory computer readable storage medium having instructions, which when executed by a processor, perform actions) directly loadable into a memory of a digital computer, comprising software code portions for performing the steps of the method as described herein.

In addition, the problem stated above is solved by a computer-readable medium, e.g., storage of any kind, having computer-executable instructions adapted to cause a computer system to perform the method as described herein.

Possible embodiments of the present invention are shown and illustrated on the basis of a block diagram illustrating a schematic overview of an exemplary embodiment of a yaw controller according to the proposed solution

BRIEF DESCRIPTION

Some of the embodiments will be described in detail, with reference to the following FIGURES, wherein like designations denote like members, wherein:

FIG. 1 shows in a block diagram a possible embodiment of a proposed yaw controller.

DETAILED DESCRIPTION

Thereby, information 105 representing actual yaw positions of the wind turbine is provided to a YawProgression unit 110 calculating an actual YawProgression on the basis of the provided yaw positions 105 representing yaw activities of the wind turbine within a defined time interval in the past. The time interval to be considered by the YawProgression unit 110 is defined by a time parameter 111 provided to a control input 112 of the YawProgression unit 110.

Information 115 representing the calculated yaw progression is forwarded to an adjustment unit 120. Filter adjustment information 125 is determined on the basis of the provided yaw progression information 115 and being forwarded to an adjustment input 152 of a filter unit 150.

The filter adjustment information 125 may exemplarily represent a filter time constant. Alternatively the filter adjustment information 125 may represent a parameter being used for adjusting a filter time constant of the filter unit 150.

Further, threshold adjustment information 126 is determined by the adjustment unit 120 on the basis of the provided yaw progression information 115 and being forwarded to an adjustment input 161 of a comparing unit 160.

The threshold adjustment information 126 may be representing a value of yaw error threshold. Alternatively the threshold adjustment information 126 may represent a parameter being used for adjusting the yaw error threshold value which might be stored in the comparing unit 160.

Angular yaw error information 151 (representing a misalignment between measured wind direction and the corresponding yaw angle direction of the nacelle) is provided to a further input 153 of the filter unit 150 wherein the yaw error information 151 is filtered on basis of the provided filter time constant 125. Resulting filtered yaw error information 154 is forwarded to an input 163 of the comparing unit 160.

A threshold value being used by the comparing unit 160 is adjusted according to the provided threshold adjustment information 126. The forwarded filtered yaw error information 154 is compared with the adjusted threshold value. Dependent from the result of the comparison a yaw control signal 165 is generated being provided at a control output 162 of the comparing unit 160.

According to an exemplary embodiment of the present invention a "true" yaw control signal 165 is generated in case the filtered yaw error information 154 exceeds the adjusted threshold. Otherwise a "false" yaw control signal 165 is generated disabling any yaw actuation.

Triggered by the "true" yaw control signal 165 yaw actuation is finally initiated.

According to an advantageous embodiment the adjustment unit 120 may be implemented on the basis of a PI controller determining the filter adjustment information 125 and the threshold adjustment information 126 in order to reach a certain target value of the yaw progression information 115. For that, a respective target value of the yaw progression information may be provided as a control parameter 121 to a control input 122 of the adjustment unit 120 thereby enabling the adjustment unit 120 acting as a PI controller.

In contrast to the known evaluation of yaw activities without considering the actual movement of the nacelle or change of the incoming wind over a given time interval, the proposed solution specifically evaluates the effectiveness of yaw activities. This favors individual needs/conditions of a wind turbine.

According to a further aspect, the presented solution represents an advantageous extension of existing yaw controllers.

As an advantage, the present invention allows an autonomous adjustment of the configuration of a yaw controller being independent of necessary assumptions being used for wind turbine design.

As a further aspect, bigger yaw activities being necessary to orient the nacelle towards a new yaw direction in case of a significant wind direction change is not penalized. However, moving the nacelle position back and forth over a shorter time interval will be penalized.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A method for controlling yawing of a wind turbine, the method comprising:
   determining, by a processor, an efficiency information based on previous yaw activities within a defined time interval in the past, wherein the efficiency information reflects a relationship between an effective angular change between at least two yaw positions of the previous yaw activities;
   determining, by the processor, a corresponding accumulated angular movement between the at least two yaw positions; and
   controlling, by the processor, yawing of the wind turbine based on the efficiency information.

2. The method according to claim 1, wherein the controlling is on a basis of captured yaw angle error information wherein the captured yaw angle error information is processed on a basis of the efficiency information.

3. The method according to claim 2, wherein:
   the captured yaw angle error information is filtered on a basis of a filter time constant being derived on the basis of the efficiency information, and
   the yawing is controlled on the basis of the filtered yaw angle error information.

4. The method according to claim 2, wherein:
   the captured yaw angle error information is compared with a given threshold information,
   the threshold information is derived on the basis of the efficiency information, the yawing is controlled on a basis of the result of a comparison with the given threshold information.

5. The method according to claim 3, wherein the filtered yaw angle error information is processed on the basis of the efficiency information.

6. The method according to claim 5, wherein:
   the filtered yaw angle error information is compared with a given threshold information,
   the threshold information is derived on the basis of the efficiency information,
   the yawing is controlled on the basis of the result of a comparison with the given threshold information.

7. The method according to claim 1, wherein the efficiency information is determined according to the following rule:

$$YawProgression\ [\%] = \frac{YawMovement}{YawActuation} * 100\%$$

wherein
YawProgression is representing the efficiency information
YawMovement is representing the effective angular change
YawActuation is representing accumulated angular movement.

8. The method according to claim 7, wherein:
   the effective angular change is determined according to the following rule:

$$YawMovement\ [deg] = abs(YawPosition(T1) - YawPosition(T2))$$

the corresponding accumulated angular movement is determined according to the following rule:

$$YawActuation\ [deg] = \sum_{k=TimeStart=T1}^{k=TimeStop=T2} abs(YawPosition(k) - YawPosition(k-1))$$

wherein
YawPosition is a first angular yaw position of the nacelle at a beginning of a defined time interval,
YawPosition is a second angular yaw position of the nacelle at an end of the defined time interval.

9. The method according to claim 1, wherein the yawing is controlled in such a way that the efficiency information is reaching a target value.

10. The method according to claim 1, wherein the yawing is controlled on the basis of a PI-controller.

11. A wind turbine, comprising:
    a processing unit that is arranged for:
    determining an efficiency information based on previous yaw activities within a defined time interval in the past, wherein the efficiency information reflects a relationship between an effective angular change between at least two yaw positions of the previous yaw activities, and a corresponding accumulated angular movement between the at least two yaw positions; and
    controlling yawing of the wind turbine based on the efficiency information.

12. A device comprising a processor unit and/or hard-wired circuit and/or a logic device that is arranged such that the method according to claim 1 is executable thereon.

13. A computer program product, comprising a non-transitory computer readable hardware storage device having computer readable program code stored therein, said program code executable by a processor of a computer system to implement the method according to claim 1.

14. A non-transitory computer readable medium, having computer-executable instructions adapted to cause a computer system to perform the steps of the method according to claim 1.

* * * * *